(12) United States Patent
Dukart

(10) Patent No.: US 6,986,293 B2
(45) Date of Patent: Jan. 17, 2006

(54) FORCE MEASURING DEVICE, IN PARTICULAR FOR SEAT WEIGHT DETERMINATION IN A MOTOR VEHICLE

(75) Inventor: Anton Dukart, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/406,773

(22) Filed: Apr. 3, 2003

(65) Prior Publication Data

US 2004/0079175 A1    Apr. 29, 2004

(30) Foreign Application Priority Data

Apr. 16, 2002 (DE) ................................ 102 16 723

(51) Int. Cl.
 G01L 1/26   (2006.01)
 G01L 5/04   (2006.01)
(52) U.S. Cl. ................................. 73/862.391
(58) Field of Classification Search ............... 73/774, 73/18.1, 862.391, 862.625
See application file for complete search history.

(56) References Cited

U.S. PATENT DOCUMENTS 4,982,613 A * 1/1991 Becker ............... 73/862.625
5,344,204 A * 9/1994 Liu .......................... 296/68.1
5,392,654 A   2/1995 Boyle
5,584,627 A   12/1996 Ceney et al.
5,628,601 A   5/1997 Pope
5,684,254 A * 11/1997 Nakazaki et al. ............. 73/774
6,250,843 B1  6/2001 Olson et al.

FOREIGN PATENT DOCUMENTS

DE   35 15 126 A1   10/1986
EP   0 787 980 A2   8/1997

* cited by examiner

Primary Examiner—Max Noori
Assistant Examiner—Octavia Davis
(74) Attorney, Agent, or Firm—Michael J. Striker

(57) ABSTRACT

A force measuring device for seat weight determination in a motor vehicle includes a taking up element which has at least two bearing points. The device further includes a mechanism forming a first recess in the taking up element in a region between at least two bearing points and a rod-shaped element which extends in the longitudinal axis of the taking up element and is not loaded by bending forces. The rod-shaped element has a free end which deviates from the longitudinal axis of the taking up element when a force to be measured acts on the taking up element, and a measuring unit with a magnet and a magnetic field-sensitive sensor The magnet and the magnetic field-sensitive sensor are arranged immovably relative to one another so that the distance from the magnet to a ferromagnetic material changes under loading with the force.

9 Claims, 2 Drawing Sheets

US 6,986,293 B2

FORCE MEASURING DEVICE, IN PARTICULAR FOR SEAT WEIGHT DETERMINATION IN A MOTOR VEHICLE

BACKGROUND OF THE INVENTION

The present invention relates to a force measuring device, in particular for seat weight determination in a motor vehicle.

Force sensors of the above mentioned general type are known in the art. One of such force sensors is disclosed in the German patent document DE 35 15 126 A1. In this force sensor shown in FIG. 2 a magnet is arranged at a free end of the bar-shaped element, whose position changes in response to an exterior loading of the taking up element relative to a magnetic field-sensitive sensor element, and the sensor element is arranged immovably in the region of a bearing point of the taking up element. Because of the separate arrangement of the magnet and the magnetic field-sensitive sensor element, the correct balancing of the measuring system as well as its mounting in the taking up element are relatively expensive.

SUMMARY OF THE INVENTION

Accordingly, it is an object of the present invention to provide a force measuring device for a seat weight determination in a motor vehicle, which is an improvement of the existing devices of this type.

In keeping with these objects and with others which will become apparent hereinafter, one feature of the present invention resides, briefly stated, in force measuring device which has taking up element which has at least two bearing points spaced from one another and arranged so that one of said bearing points is loadable with a force to be measured perpendicularly relative to a longitudinal axis of said taking up element; means forming a first recess in said taking up element in a region between at least two bearing points; a rod-shaped element which extends in the longitudinal axis of said taking up element and is not loaded by bending forces, said rod-shaped element having a free end which deviates from said longitudinal axis of said taking up element when a force to be measured acts on said taking up element; and a measuring unit for detecting the deviation of the free end of the rod-shaped element, said measuring unit having a magnet and a magnetic field-sensitive sensor, said magnet and said magnetic field-sensitive sensor being arranged immovably relative to one another and said magnet is arranged close at a distance to a ferromagnetic material so that the distance of the magnet to the ferromagnetic material changes under a loading with the force to be measured.

When the force measuring device is designed in accordance with the present invention, its balancing as well as its mounting in the taking up element is possible in a significantly simpler manner.

With the immovable mutual arrangement of the magnet and the magnetic field-sensitive sensor immovable relative to one another, the magnet is surrounded by a ferromagnetic material with a distance to the magnet which changes depending on an exterior loading of the taking up element. Thereby it is possible to completely mount and balance the measuring arrangement composed of the magnets and the magnetic field-sensitive sensor outside of the taking up element, and then mount subsequently it as a unit in the taking up element.

In accordance with another embodiment of the present invention, with the magnetic field-sensitive sensor when the force-loaded taking up element is not loaded, it is arranged in alignment with the pole axis of the magnet. This provides the advantage that the zero point over the service life of the force measuring device has a relatively high accuracy since the aging as well as temperature dependency both of the permanent magnets and also the magnet yokes do not act negatively on a drift of the zero point. Moreover, this arrangement a polarity-sign accurate detection of the magnetic field and therefore also a force direction detection.

In accordance with a preferable embodiment of the present invention, the bar-shaped element is arranged on the taking up element and mounted in the region of the stationary bearing point. Thereby it is possible to introduce the measuring device as a relatively short unit from the other bearing point into the taking up element, so that a very simple and relatively accurate mounting process is utilized.

In accordance with a further preferable embodiment of the invention, the taking up element is formed as a rotation-symmetrical component. The first receptacle is formed as a throughgoing passage arranged perpendicular to the axis of symmetry, so that with respect to the first receptacle two connecting webs which extend parallel to one another are provided and connect the bearing points with one another. With this construction an especially high deformation and therefore a sensitivity of the force measuring device is possible when a force is applied perpendicular to the longitudinal axis of the taking up element.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
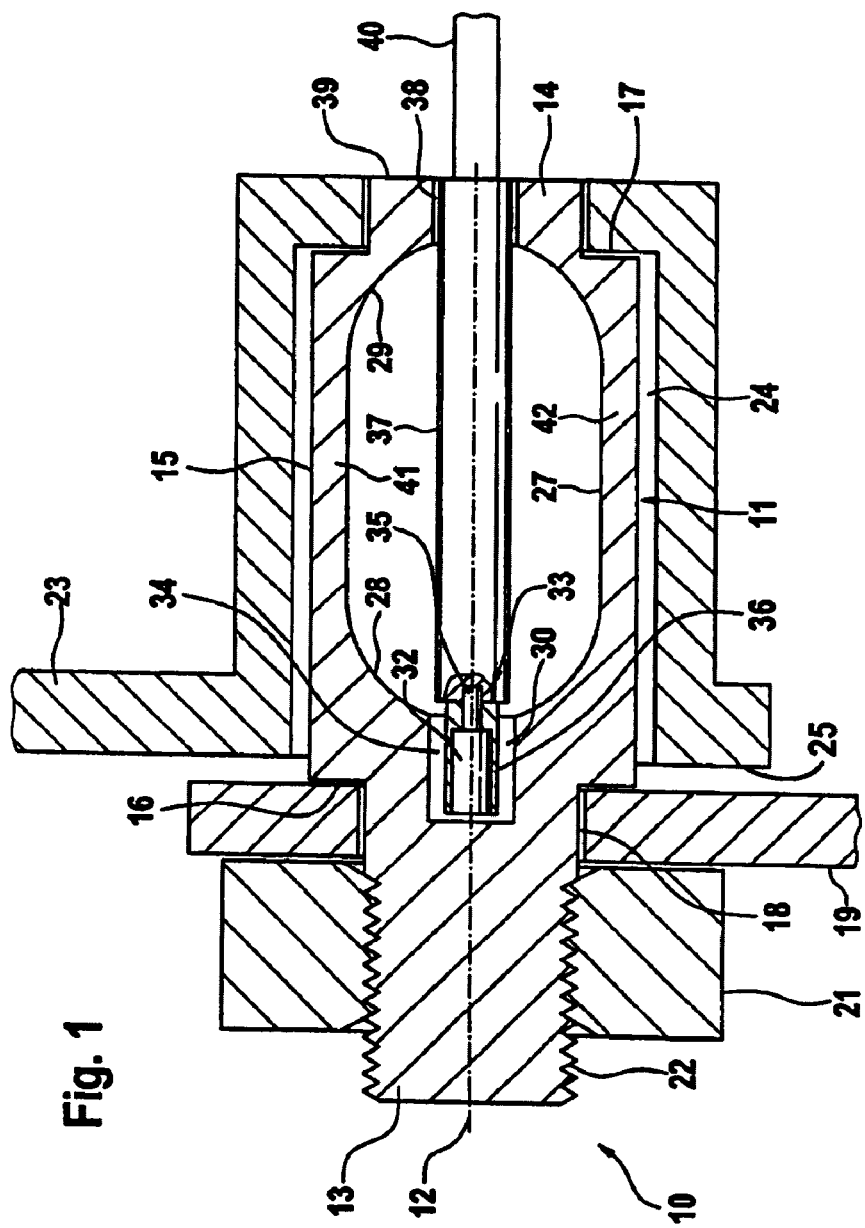
FIG. 1 is a view showing a force measuring device in accordance with a first embodiment of the invention, in a simplified longitudinal section.

A force measuring device shown in FIG. 1 is identified as a whole with reference numeral 10 and is used for a seat weight determination in a motor vehicle. Such a seat weight determination is required in modern motor vehicles for example for correctly controlling the timely process of a seat belt course as well as the airbag release.

The force measuring device 10 has a bearing body 11 which is formed as a rotation-symmetrical component with a longitudinal axis 13. The bearing body 11 is composed of a ferromagnetic material and has at its opposite sides end portions 13 and 14 with a diameter which is smaller than the diameter of a central portion 15. Shoulders 16 and 17 are formed between the end portions 13, 14 and the central portion 15. They serve as abutments.

The bearing body 11 is inserted with its end portion 13 into an opening 18 of a seat rail 19 which serves as a stationary bearing. The bearing body 11 can be fixed rigidly on the seat rail 19 by a nut 21 which cooperates with a thread 22 on the end portion 13. A lever 23 is arranged displaceably and fixedly on the other end portion 14 of the bearing body 11. It is a component of a not shown seat of the motor vehicle. Between the lever 23 and the bearing body 11, there is a connection only in the region of the end portion 14, while a gap 24 is provided between the lever 23 and the central portion 15 of the bearing body 11. A seat force F to be measured is thereby transmitted through the lever 23 to the end portion 14 of the bearing body 11, and deforms it because of the one-side bearing in the rail 19.

The magnitude of the deformation because of the force F is dependent in a known manner on the distance between both bearing points, or in other words the distance between the rail 19 and the bearing shoulder 25 of the lever 23.

The bearing body 11 has a first recess formed as a throughgoing passage 27 located substantially in the central portion 15. The throughgoing passage 27 is produced by milling and has a rounded inner walls 28 and 29 for preventing a notch-action during loading by the force F, in the region of the sides facing the end portions 13 and 14. A second recess formed as a blind hole 30 extends from the bottom of the inner wall 28 which faces the seat rail 19. Its center point extends in the longitudinal axis 12. The base of the blind hole 30 extends substantially to the middle height of the seat rail 19.

A permanent magnet 32 of a sensor arrangement 33 extends into the blind hole 30 with small clearance, in particular with a small radial gap 34. The sensor arrangement 33 includes, in addition to the permanent magnet 32, also a magnetic field-sensitive sensor 35 which is formed for example as a Hall-IC. It is important that the permanent magnet 32 and the sensor 35 are arranged immovable relative to one another on a support 36, and the pole axis of the permanent magnet 32 extends in the longitudinal axis 12 of the bearing body 11. The support 36 is mounted on the a plug sleeve 37. The plug sleeve in turn extends through a throughgoing hole 28 at the end side 39 of the bearing body 11 and is rigidly coupled there with the bearing body 11. Because of the construction as a plug sleeve 37, the electrical contacting of the sensor arrangement 33 is possible by a cable 40 through the inner wall of the plug sleeve 37.

Figure 2:
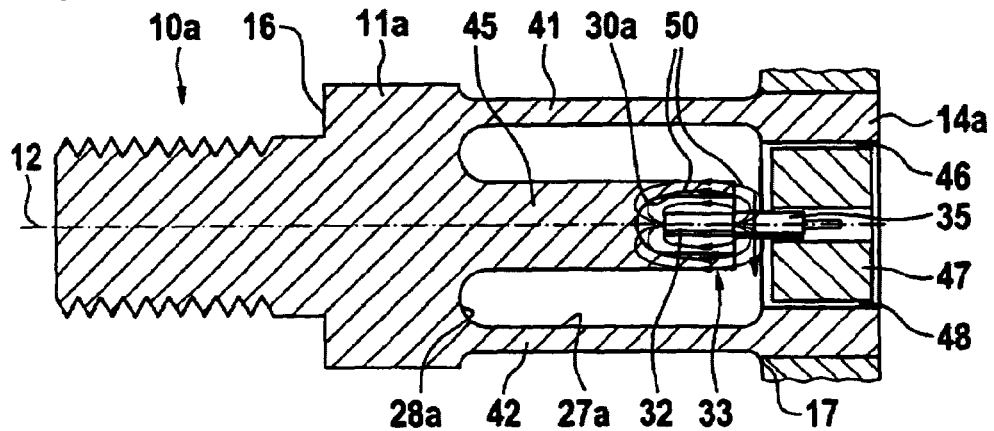
FIGS. 2–4 are views showing a second inventive force measuring device, also in a longitudinal section under different loading conditions.
Figure 4:
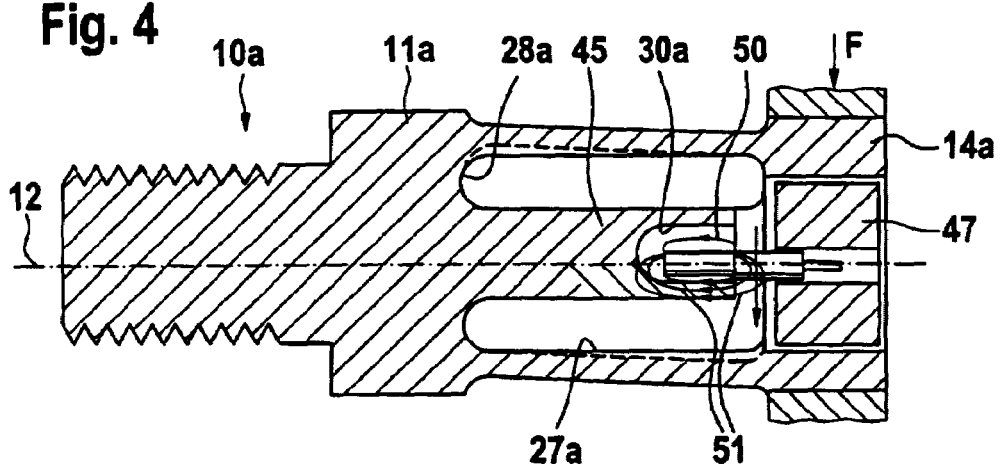

Due to the above described construction of the bearing body 11 with its throughgoing passage 27, two connecting webs 41 and 42 are formed and extend parallel to the longitudinal axis 12. When a force F is applied the bearing body is deformed in form of a double-bending beam. As a result the plug sleeve 37 does not take part in the deformation of the bearing body 11. Moreover, the plug sleeve 37 moves out from its immovable position in the longitudinal axis 12, and the magnitude of the radial gap 34 as considered in a peripheral direction changes non-uniformly. Because of the arrangement of the radial gap 34 the field intensity of the magnetic field lines of the permanent magnet 32 increases in the region of the smaller radial gap 34. This change of the field intensity is detected by the sensor 35 and converted by an evaluating circuit into a signal for a corresponding seat force. FIGS. 2 and 4 show the deformation of the bearing body 11 as well as a change of the magnetic field lines, in connection with a second embodiment.

Figure 3:
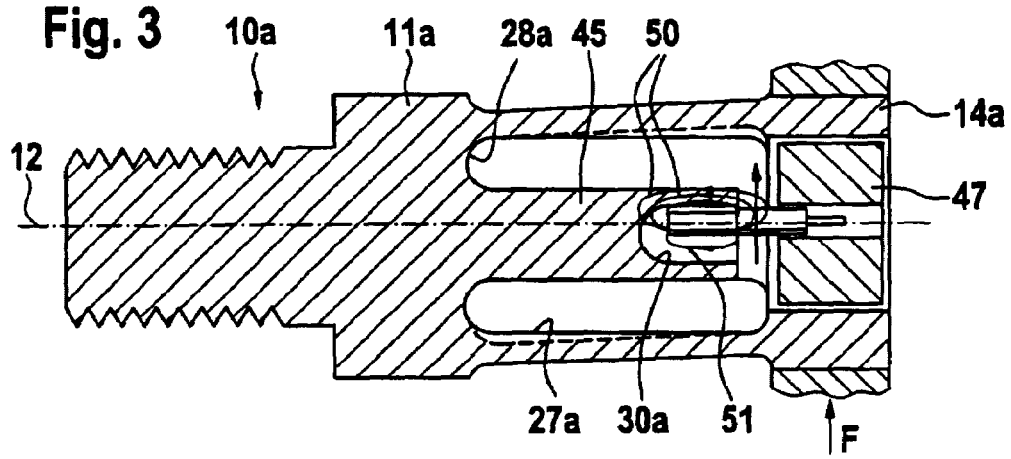

In the second embodiment of the invention shown in FIGS. 2–4, the force measuring device 10a has a bearing body 11a. The bearing body 11a differs from the bearing body 11 substantially by a pin-shaped projection 45, which is arranged in the throughgoing passage 27a. The projection 45 which can be formed for example of one piece on the bearing body 11a, extends from the inner wall 28a at the side facing the seat rail 19. The projection 45 does not take part in the deformation of the bearing body 11a during loading with a force F. At its free end it has a second recess formed as the blind hole 30a. The projection 45 or the blind hole 30a extend close to the an end portion 14a to provide a maximum possible deviation during a deformation of the bearing body 11a. The permanent magnet 32 of the sensor arrangement 33 extends into the blind hole 30a. It is arranged in the throughgoing opening 46 of a ring-shaped support 47. The support 47 in turn is inserted in a throughgoing opening 48 at the end portion 14a.

FIG. 2 shows non-loaded condition of the bearing body 11a. The magnetic field lines 50, 51 at both sides of the permanent magnet 32 extends symmetrically to the longitudinal axis 12, since the distance from the permanent magnet 32 to the projection 45 composed of a ferromagnetic material is identical at all sides.

FIG. 3 shows the condition in which the bearing body is loaded from below with a force F. As a result the end portion 14a together with the carrier 47 with the sensor arrangement 33 is displaced outwardly of the longitudinal axis 12 upwardly and the distance from the permanent magnet 32 to the projection 45 changes. As a result, the field intensity increases at the side, at which in the permanent magnet 32 has a smaller distance to the projection 45. This is shown by an increased number of the magnetic field lines 50, in contrast to a reduced number of the magnetic lines 51. The correspondingly changed a field intensity is detected by the sensor 35 and converted in a corresponding weight signal.

Similarly but in a reverse way, the field intensity or the number of the magnetic field lines 51 increases in the bearing body 11a shown in FIG. 4 when it is loaded from above with the force F. Since the sensor 35 detects not only the absolute intensity of the magnetic field but also its direction, it is therefore possible to detect with the selected arrangement not only the absolute magnitude of the seat force but also its direction.

It will be understood that each of the elements described above, or two or more together, may also find a useful application in other types of constructions differing from the types described above.

While the invention has been illustrated and described as embodied in force measuring device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A force measuring device for seat weight determination in a motor vehicle, comprising:
    a taking up element having at least two bearing points spaced from one another and arranged so that one of the bearing points is loadable with a force to be measured perpendicularly relative to a longitudinal axis of said taking up element, wherein the taking up element has opposite sides, wherein said opposite sides have end portions having a diameter that is smaller than a diameter of a central portion, wherein the taking up element is inserted with a first one of said end portions into an opening of a seat rail which serves as a stationary bearing;
    a lever arranged displaceably and fixably on a second one of said end portions of the taking up element;

means forming a first recess in the taking up element in a region between at least two bearing points;

a rod-shaped element which extends in the longitudinal axis of said taking up element and is not loaded by bending forces, said rod-shaped element having a free end which deviates from said longitudinal axis of said taking up element when a force to be measured acts on said taking up element; and a measuring unit for detecting the deviation of the free end of the rod-shaped element, said measuring unit having a magnet and a magnetic field-sensitive sensor, said magnet and said magnetic field-sensitive sensor being arranged immovably relative to one another and said magnet is arranged close at a distance to a ferromagnetic material so that the distance from the magnet to a ferromagnetic material changes under a loading with the force to be measured, and wherein said taking up element is composed of a ferromagnetic material and has a second opening formed as a blind hole, said magnet being introduced into said blind hole with a small plate.

2. A force measuring device as defined in claim 1, wherein said magnetic field-sensitive sensor is arranged in alignment to a pole axis of said magnet when said taking up element is not loaded with a force.

3. A force measuring device as defined in claim 1, wherein said magnet and said magnetic field-sensitive sensor are arranged at a free end of said rod-shaped element, said blind hole being arranged in a region of said immovable bearing point in said taking up element.

4. A force measuring device as defined in claim 3, wherein said rod-shaped element is formed as a separate component.

5. A force measuring device as defined in claim 1, wherein said rod-shaped element is arranged in said taking up element and formed at a side which faces the stationary bearing point.

6. A force measuring device as defined in claim 5, wherein said rod-shaped element has a free end provided with a blind hole in which said magnet is inserted with a small gap.

7. A force measuring device as defined in claim 1, wherein said taking up element is formed as a rotation-symmetrical component and has a first recess arranged substantially perpendicular to said longitudinal axis of said taking up element, so that two connecting webs which extend parallel to the longitudinal axis of said taking up element are formed and connect said two bearing points with one another.

8. A force measuring device as defined in claim 7, wherein said first recess is rounded in a transition region to said bearing points.

9. A force measuring device as defined in claim 7, wherein said taking up element in a region of said bearing points is provided with shoulders which form an abutment for a stationary bearing element and also an abutment in a region of said taking up element for a cup-shaped bearing element into which the force to be measured is introduced.

* * * * *